Sept. 22, 1970   G. B. MEGINNIS   3,529,905
CELLULAR METAL AND SEAL
Filed Aug. 24, 1967

INVENTOR.
George B. Meginnis
BY
Paul Fitzpatrick
ATTORNEY

United States Patent Office 3,529,905
Patented Sept. 22, 1970

3,529,905
CELLULAR METAL AND SEAL
George B. Meginnis, Indianapolis, Ind., assignor to General Motors Corporation, Detroit, Mich., a corporation of Delaware
Continuation-in-part of application Ser. No. 601,063, Dec. 12, 1966. This application Aug. 24, 1967, Ser. No. 667,027
Int. Cl. F01d 11/08
U.S. Cl. 415—176                          32 Claims

ABSTRACT OF THE DISCLOSURE

A metal structure of high strength relative to density and readily abradable composed of laminae bonded together. The laminae, or some of them, have holes or pits in them which are closed to provide a cellular structure when the laminae are joined. This may be used as one element of a labyrinth or blade tip seal.

---

This application is a continuation-in-part of my application Ser. No. 601,063, filed Dec. 12, 1966, now abandoned.

The invention herein described was made in the course of work under a contract or subcontract thereunder with the Department of Defense.

My invention relates to cellular metallic materials, particularly to such material adapted for use in high temperature environments, and to sealing rings and the like made of the cellular material. In order to provide a seal strip, for use in labyrinth seals and such, that can be eroded away without too much difficulty in the event of interference between the rotating and stationary parts, there have been proposals to use various soft or friable materials and to use metal honeycombs. The metal honeycombs have been proposed particularly for turbine and other hot environments, since the honeycomb may be made of high temperature resisting metal. Because of its open or porous structure, the honeycomb is more readily cut or worn away or crushed when there is interference between the rotating and stationary parts of a seal. Some examples of disclosures along this line are found in the U.S. patents to Smile et al. No. 2,963,268, Bobo No. 2,963,307, Curtis et al. No. 3,042,365, and Bowers et al. No. 3,126,149.

My invention involves a laminated cellular material which is in some ways a development or modification of that described and claimed in U.S. patent application Ser. No. 526,207 of Bratkovich and Meginnis for Laminated Porous Metal, filed Feb. 9, 1966, of common ownership with this application. The principal point of my present invention, however, is that the sheets are so formed before being laminated together that the laminated material defines cavities or cells which occupy a large part of the volume of the material to create a low-density metal and the cells are preferably relatively or completely isolated from each other so that the material is not ordinarily very pervious to fluid flow in any direction. However, the procedure of etching or machining the sheets and of uniting them by diffusion bonding or other processes and the high temperature alloys referred to in the prior application are suitable for manufacture of my cellular material.

Gases flowing through a turbine engine increase the temperature of engine parts, inducing growth and distortion during each cycle and from cycle to cycle. To avoid gross rubbing interference between rotating and stationary parts, sufficiently large cold clearances could be provided. However, these could not accommodate distortion and would necessarily afford large areas for gas leakage, leading to decreased engine efficiency.

A sealing element is required which will tolerate the rubbing until it is abraded or worn to effect a close fit at the engine operating temperature. This minimizes the gas leakage past the rotating element. To provide satisfactory service life the seals must have many of the attributes of the mating components, excepting, perhaps, high strength, since it can be supported by or mounted upon one of the components.

The problem is solved by producing a material containing many small voids. Secured to one of the mating components with the minimum possible cold clearance for assembly, it will collapse or be otherwise penetrated by the rubbing surfaces of the second component. Even relatively strong materials and with good oxidation resistance, selected with primary consideration of the environment, may be qualified for attrition in the operation primarily because of the reduced density. It is required only that the material have sufficient ductility for forming, be producible in sheets of low density, and be amenable to a laminate bonding operation which will provide adequate strength at the engine service temperature. Compared with other seal materials it may or may not be readily cut by a blunt edged part, it will have a continuous lattice structure to avoid internal gas flow, the void size will be small relative to the width of the contact surface of the adjacent rubbing component, and it will incorporate an integral mounting strip for reliable attachment to an engine component.

Prior art honeycomb materials are made by welding or brazing foils together in strip form and then expanding them to form a latticework with openings not known to be smaller than about 1/16 inch. Strips of the honeycomb are brazed onto one of the engine component surfaces to be sealed. The voids are then filled to prevent gas leakage past the extremity of the necessarily narrow sealing surfaces of the mating component. This narrow surface might be a series of circular lands or an airfoil shaped blade. Under these circumstances the honeycomb is essentially a seal material retainer. My material can readily be made with voids on the order of .010″ to .020″ which are small enough to prevent leakage without filler. It is much more amenable to welding or brazing attachment simply because of the larger mass in the latticework and in the integral solid backing strip, which also blocks braze flow into the walls and voids in the working area of the seal. This is particularly important in the case of high temperature seals requiring braze alloys with active elements such as boron or silicon. These elements diffuse rapidly into the thin metals and have an embrittling effect which can damage their response, by attrition, to the rubbing action. It is obviously a greater problem with the thin honeycomb materials which do not have a mounting strip. The integral strip also allows mechanical attachment by tangs, spun flanges, etc. It may be noted also that the increased mass of the latticework, compared with thin walled honeycombs, does not prevent it designed collapse or penetration in its function as a seal.

There are other seal materials such as sprayed metals, electroplated metals, and a wide variety of filled porous materials which are viable or frangible to varying degrees when cut or abraded by a blunt edged part, a characteristic of one of the component surfaces to be sealed. Environmental conditions, particularly at high temperature, add such great demands that few, if any, completely satisfactory materials are available. For instance, frangibility and erosion resistance are not necessarily compatible requirements. My concept of discontinuous voids can be incorporated in many materials to condition them for the abrading essential to the sealing function. Many metals and alloys may be considered for use over a wide range of temperatures.

The cellular materials according to my invention are quite different from laminated materials porous to flow from face to face, as in U.S. Pat. No. 2,720,356, or parallel to the faces of the sheet, as in U.S. Pat. No. 3,013,641.

The principal objects of my invention are to provide a cellular metallic material, particularly a high temperature one, to provide a metallic material having high overall strength with respect to its weight but which is much more readily abradable than a solid metal, to provide an improved abradable seal, particularly one suitable for high temperatures and, in general, to improve seals and to improve the performance and utility of rotating machinery, particularly high temperature turbomachinery. The provision of sheet material having small empty non-intercommunicating cells for cooperation with labyrinth seal ridges or turbomachine blade tips, is an important object of the invention.

The nature and advantages of my invention will be clear to those skilled in the art from the succeeding detailed description of preferred embodiments of the invention and the accompanying drawings thereof.

Figure 1:
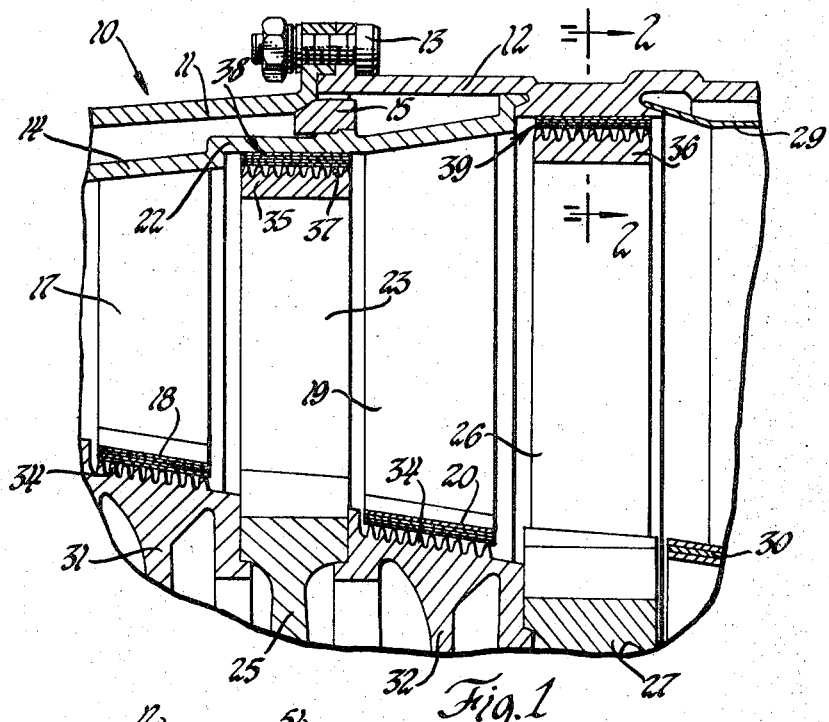
FIG. 1 is a partial sectional view of a turbine taken on a plane containing the axis of the turbine.

FIG. 1 is presented primarily to illustrate typical applications of my cellular material in labyrinth seals of a turbine. The seal is shown as applied to a turbine generally similar to that described in U.S. Pat. No. 2,766,963 of Zimmerman for Turbine Stator Assembly, issued Oct. 16, 1956. The turbine comprises an outer case 10 including a forward section 11 and a rear section 12 joined by bolts 13. Two stages of turbine nozzle vanes are mounted on an inner shroud 14 retained between the casing sections and located by keys 15. Vanes 17 mount a shroud ring 18 at their inner ends and vanes 19 mount a similar shroud ring 20. The shrouds 14, 18 and 20 preferably are segmented. The shroud 14 also defines a stationary shroud 22 around the periphery of a ring of rotor blades 23 mounted on a wheel 25. The casing section 12 shrouds a second stage of rotor blades 26 mounted on a wheel 27. An exhaust passage from the turbine is defined by outer and inner shrouds 29 and 30. Spacer disks 31 and 32 are disposed between the turbine wheels. Additional turbine wheels and stator stages are not illustrated. The spacer disks bear labyrinth seal ridges 34 which cooperate with the inner shrouds 18 and 20. The rotor blades may or may not be shrouded but, as illustrated, bear outer shrouds 35 and 36 having circumferential labyrinth sealing ridges 37 to cooperate with the stationary structure of the turbine.

The cellular sealing strip, rings, or segmented rings 18 and 20 on the stator vane rings and similar rings or strips 38 and 39 on the turbine casing are preferably made of a cellular laminated metallic material, to be described, so that the clearance of the labyrinth seals may be a minimum for improved efficiency and any interference may be resolved by wear or crushing of the cellular material. The seals may typically be made of material such as Hastelloy X or nickel.

Figure 2:
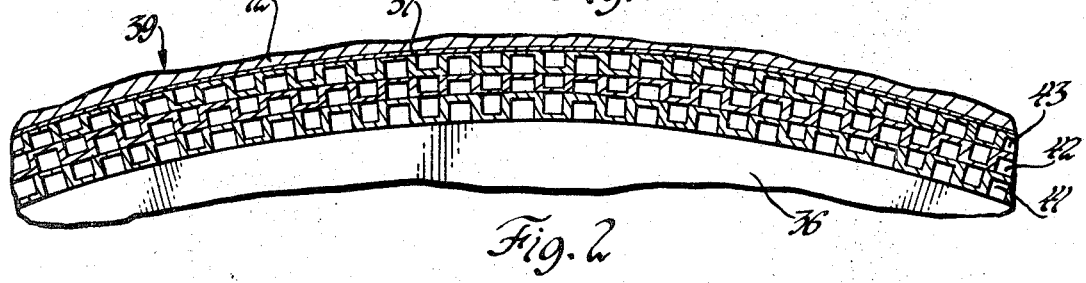
FIG. 2 is a fragmentary enlarged sectional view taken on the plane indicated by the line 2—2 in FIG. 1 illustrating a labyrinth seal strip.
Figures 3, 4:
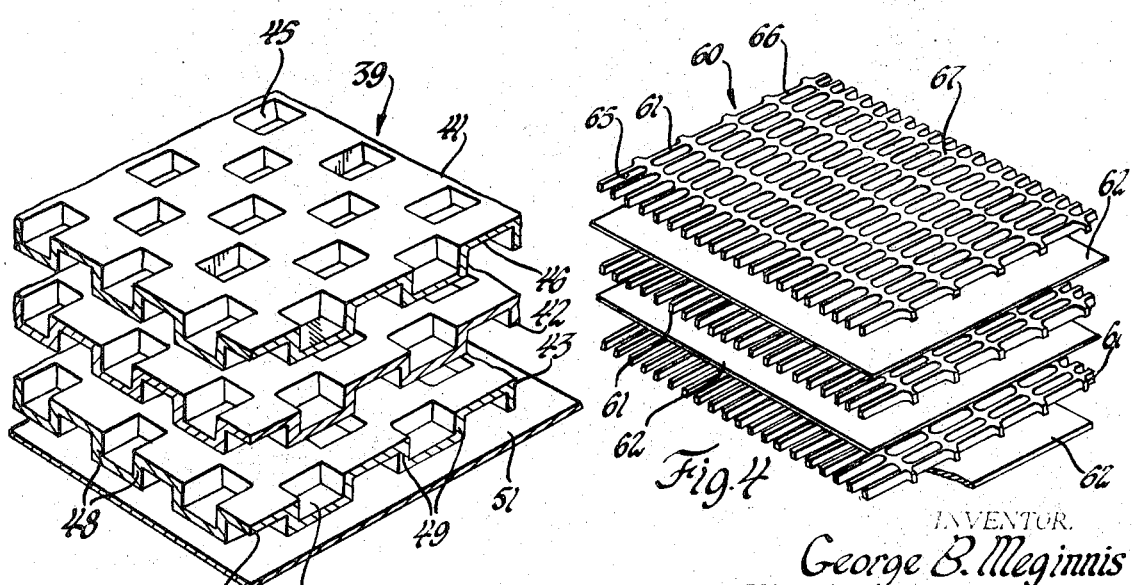
FIG. 3 is an exploded axonometric view illustrating the character and formation of the cellular material of FIGS. 1 and 2.
FIG. 4 is a view similar to FIG. 3 illustrating a second form of cellular material.

Now referring to FIGS. 2 and 3, one form of cellular laminate is illustrated. The seal in this case comprises three laminations or layers 41, 42, and 43, each of which is a sheet of metal and each of which has both surfaces etched to provide alternating checkerboard patterns of recesses, holes, or voids 45 in the upper surface and 46 in the lower surface. The upper surface is referred to here as the radially inner surface of the seal. Such etching leaves two continuous sets of walls extending from face to face of the sheet, walls 48 running in one direction and walls 49 running at right angles to ridges 45. Alternate spaces between these walls in a checkerboard pattern are etched in from each side of the sheet to provide the holes 45 and 46. When the sheets are stacked with the holes 45 of all the sheets in alignment and likewise the holes 46 of the several sets in alignment and are bonded together, each sheet covers and closes the holes in adjacent sheets so as to define cells which are closed and isolated from each other. Put another way, the edges of the webs 48 and 49 which define a rib pattern are bonded together. With this structure, closed cells are defined between any two adjacent sheets. In addition, the holes 45 of the upper sheet provide pockets or depressions in the metal. Depending upon use, dimensions may be somewhat critical, and reference to preferred dimensions may be helpful in understanding and practicing the invention. In a particular case, the sheets such as 41 and 42 are originally 0.010 inch thick. The holes are 0.027 inch by 0.019 inch and 0.008 to 0.009 inch deep. The walls 48 and 49 between the holes are 0.003 inch thick. The size of the voids should be small in relation to the width of the edge of the element, such as the seal ridges 34, with which they cooperate. There may be any number of sheets, but the three sheets as illustrated providing a metal approximately 0.030 inch thick should be sufficient for the purpose stated in a turbine of moderate size.

In the labyrinth seal as shown in FIG. 1, the smaller (0.019") dimension of the holes is in the direction across the seal (axially of the turbine). In a blade tip seal, the longer dimension of the holes would be disposed approximately chordwise of the blade tip.

Ordinarily, if the seal is to be brazed, welded, or otherwise fixed to a turbine part such as case 12, the seal material also includes a mounting sheet 51 which is preferably flat and which is bonded to the sheet 43. As shown in FIG. 2, sheet 51 lies against the case. This sheet prevents harmful diffusion of elements in the brazing alloy into the thin walls of seal 39. To serve this purpose, sheet 51 ordinarily should be of substantial thickness, such as 0.008 inch.

A second embodiment of the invention which results in approximately the same sort of cellular structure is illustrated in FIG. 4. Here the cellular material 60 is defined by alternating sheets 61, which have holes entirely through them, and 62, which are preferably simply flat, unrelieved, or unetched sheets. In this case the sheets 61 have a grid pattern of holes 65 entirely through the sheets so that there remains a grid defined by walls 66 extending in one direction and 67 extending at right angles thereto. In this case the sheet in which the voids are defined may be preferably 0.010 inch thick and the flat sheet may be 0.001 inch thick. The walls 66 and 67 are preferably about 0.003 inch thick as before. In the particular embodiment illustrated, the holes 65 are approximately 0.065 inch long and 0.019 inch wide. As with the embodiment of FIG. 3, the shorter (0.019") dimension of the holes extends in the direction of leakage flow across the seal. With such a narrow gap, there is no need for a filler, and no increase in leakage over what would occur with an unbroken surface on the sealing strip. In other words, the holes are not large enough to bypass the seal ridge or blade tip, and the roughness due to the narrow gaps may increase resistance to flow through the seal gap.

It may be noted that in both forms of the invention (FIG. 3 or FIG. 4) the laminated structure may be considered as made up of alternating sheets of two sets in which the sheets of one set close holes in the other set. This is true whether the holes are entirely in one set of the sheets, as in FIG. 4, or in both sets of sheets, as in FIG. 3. With both species of seal material, it is contemplated that the walls such as 48 and 49 or 66 and 67 be at an angle to the direction of movement of the moving seal ridges so that a wall area will not coincide through a large arc with a sealing ridge. This makes the cellular material comply more readily and more uniformly with the seal ridges. A mounting sheet may be used with this embodiment, and this sheet may be the lowermost sheet 62 as illustrated in FIG. 4.

Also it should be noted that two or more laminae of one kind, such as 61 of FIG. 4, may be juxtaposed to provide in effect one sheet consisting of two or more laminae. This makes it easier to provide a deep cell without etching or otherwise forming holes through a relatively single metal lamination.

Obviously, many variations in the hole pattern may be made. Holes may be etched on both sides of a relatively thick sheet so as to leave a partition between them more or less at the middle of the thickness of the sheet. The contour of the holes may vary, and the pattern need not be uniform, but could be of a random nature. The alignment of successive sheets may vary but, depending upon the type of arrangement of holes. There should be some sort of control to prevent formation of a structure in which undesired flow through the space between the sheets would be possible. If such flow could take place in the specific installations described, it would provide a leakage path from the forward to the rearward edge of a seal such as 39. Where one set of sheets is entirely plain as in FIG. 4, there is no requirement for any alignment in the stacking so far as this result is concerned. However, the bonding may take place more successfully with the walls aligned from the top to the bottom of the stack.

The seal material such as 39 or 60 may cooperate directly with blade tips to provide a minimum clearance seal around the periphery of a turbine rotor. In terms of the structure illustrated in FIG. 1, this involves omitting the shroud such as 35 or 36 from the blades and having the blade tips extend closely adjacent the seal 38 or 39.

It will be seen that my invention provides a cellular metal in which the voids may be very small if desired and in any case may occupy much the greater part of the volume of the laminate.

The description of preferred embodiments of the invention for the purpose of explaining the principles thereof is not to be considered as limiting or restricting the invention, since many modifications may be made by the exercise of skill in the art.

I claim:

1. A cellular laminated metallic structure comprising, in combination, one or more metal sheets of a first set, metal sheets of a second set one greater in number than the number of sheets of the first set, all the said sheets having substantially flat faces, the sheets being stacked together face to face with the sets alternating, the faces of the sheets being bonded together at each interface between sheets to form a rigid cellular laminated structure, each sheet of the first set defining holes therein extending inward from the faces of the sheet and defining a grid pattern of unitary intersecting walls between the holes extending from face to face of the sheet blocking flow through the structure parallel to the sheets and defining lands at the faces of sheet between the holes, and the sheets of the second set covering and closing the holes and being bonded to the said lands, the sheets of the second set thus defining substantially closed cells with the sheets of the first set.

2. A structure as recited in claim 1 in which the sheets are of a high temperature resistant metal and the bonds between the sheets are diffusion bonds.

3. A structure as recited in claim 1 in which the holes in each sheet of the first set extend through the sheet from face to face.

4. A structure as recited in claim 1 in which the holes in each sheet of the first set are pits extending only partly through the sheet.

5. A structure as recited in claim 4 in which the pits are disposed in checkerboard patterns on opposite sides of the sheet.

6. A structure as recited in claim 1 in which the sheets of both sets are of the same configuration, with holes disposed in checkerboard patterns on opposite sides of each sheet.

7. A structure as recited in claim 1 in which each sheet of the first set is substantially thicker than the sheets of the second set and has holes extending entirely through it, and the sheets of the second set have plane unbroken faces.

8. A structure as recited in claim 1 in which the sheets of both sets are substantially imperforate.

9. A structure as recited in claim 1 disposed as one element of a labyrinth seal.

10. A structure as recited in claim 1 in combination with a rigid member rotatable relative to the said structure, the rigid member and the said structure defining a labyrinth seal.

11. A structure as recited in claim 1 in combination with a rotor wheel having blades, the structure being disposed adjacent the tips of the blades to serve as a blade tip bypass seal.

12. A cellular laminated metallic structure comprising, in combination, one or more metal sheets of a first set, one or more metal sheets of a second set, all the said sheets having substantially flat faces, at least three sheets being stacked together face to face with the sets alternating, the faces of the sheets being bonded together at each interface between sheets to form a rigid cellular laminated structure, each sheet of the first set defining holes therein extending inward from the faces of the sheet and defining a grid pattern of unitary intersecting walls between the holes extending from face to face of the sheet and defining lands at the faces of the sheet between the holes, a sheet of the second set covering and closing holes in a sheet of the second set, thus defining cells with the said sheet of the first set, and the grid pattern of walls of the sheets of the first set being configured to block flow between the sheets parallel to the sheets.

13. A structure as recited in claim 12 in which the holes in each sheet of the first set extend through the sheet from face to face.

14. A structure as recited in claim 12 in which the holes in each sheet of the first set are pits extending only partly through the sheet.

15. A structure as recited in claim 14 in which the pits are disposed in checkerboard patterns on opposite sides of the sheet.

16. A structure as recited in claim 12 in which the sheets of both sets are of the same configuration, with holes disposed in checkerboard patterns on opposite sides of each sheet.

17. A structure as recited in claim 12 in which each sheet of the first set is substantially thicker than the sheets of the second set and has holes extending entirely through it, and the sheets of the second set have plane unbroken faces.

18. A structure as recited in claim 12 in which the sheets of both sets are substantially imperforate.

19. A structure as recited in claim 12 disposed as one element of a labyrinth seal.

20. A structure as recited in claim 12 in combination with a rigid member rotatable relative to the said structure, the rigid member and the said structure defining a labyrinth seal.

21. A structure as recited in claim 20 in which the dimension of the holes in the direction of leakage flow across the seal is less than 0.030 inch.

22. A structure as recited in claim 12 in combination with a rotor wheel having blades, the structure being disposed adjacent the tips of the blades to serve as a blade tip bypass seal.

23. A structure as recited in claim 22 in which the dimension of the holes in the direction of leakage flow across the seal is less than 0.030 inch.

24. A cellular laminated metallic structure comprising, in combination, two or more metal sheets, each sheet having a checkerboard pattern of alternating lands and pits on each face, the pits extending toward but terminating short of the opposite face, the lands of one face being in register with the pits of the opposite face, the sheets being stacked together face to face and bonded together with the lands of one sheet covering and closing the pits of the adjacent layer to define closed cells within the laminated structure, each sheet defining a grid pattern of intersecting walls bounding the pits and extending from face to face of the sheet to block flow between the sheets parallel to the sheets.

25. A seal strip of closed-cell foraminous metal structure adapted to form one element of a seal the other element of which is a member rotatable relative to the said strip and in close proximity thereto, the seal strip being a laminated structure formed of abutting mutually bonded metal sheets defining small closed cells and being impervious to flow in the direction parallel to the sheets, the volume occupied by the cells being at least substantially equal to the volume occupied by the metal of the sheets so that the strip is readily deformed upon contact with the said other element to relieve interference between the said elements; the seal strip comprising first and second abutting sheets of similar configuration with a grid of crossed walls extending from face to face of each said sheet and with pits extending into each said sheet between the said walls, the walls being in register so that the walls define closed cells between the sheets within the pits; and a third sheet abutting one of the first two sheets.

26. A seal strip as recited in claim 25 in which the pits are disposed in checkerboard patterns on opposite sides of the sheets.

27. A structure as recited in claim 1 in which each sheet of the first set is of a form resulting from etching holes into a flat integral sheet.

28. A structure as recited in claim 12 in which each sheet of the first set is of a form resulting from etching holes into a flat integral sheet.

29. A structure as recited in claim 1 in which the said holes are the result of etching the first sheet.

30. A structure as recited in claim 12 in which the said holes are the result of etching the first sheet.

31. A structure as recited in claim 1 produced by etching the said holes in the said sheets of the first set, laying up the said sheets face to face, and bonding each sheet to the next adjacent sheet or sheets.

32. A structure as recited in claim 12 produced by etching the said holes in the said sheets of the first set, laying up the said sheets face to face, and bonding each sheet to the next adjacent sheet or sheets.

References Cited

UNITED STATES PATENTS

| | | |
|---|---|---|
| 2,477,852 | 8/1949 | Bacon. |
| 2,963,307 | 12/1960 | Bobo. |
| 3,068,016 | 12/1962 | Dega _____ 277—96 |
| 3,083,975 | 4/1963 | Kelly _____ 277—53 |
| 3,365,172 | 1/1968 | McDonough et al. |
| 2,734,586 | 2/1956 | Wright et al. _____ 170—159 |
| 2,738,297 | 3/1956 | Pfistershammer ____ 52—618 X |
| 3,042,365 | 7/1962 | Curtis et al. |
| 3,053,694 | 9/1962 | Daunt et al. |
| 3,151,712 | 10/1964 | Jackson _____ 52—615 |
| 3,423,070 | 1/1969 | Corrigan. |

FOREIGN PATENTS 450,524    1936  Great Britain.

EVERETTE A. POWELL, JR., Primary Examiner

U.S. Cl. X.R.

52—615; 277—96; 415—174